LEDLIE & GRAY.
Seed Planter.

No. 83,180.  Patented Oct. 20, 1868.

Witnesses:
P. T. Dodge
L. Hailer

Inventors:
W. Ledlie
G. L. Gray
by Dodge & Son
their atty.

WILLIAM LEDLIE AND GEORGE L. GRAY, OF JEFFERSON, ILLINOIS.

Letters Patent No. 83,180, dated October 20, 1868.

IMPROVEMENT IN HAND SEED-DRILL.

The Schedule referred to in these Letters Patent and making part of the same.

*To all whom it may concern:*

Be it known that we, WILLIAM LEDLIE and GEORGE L. GRAY, both of Jefferson, in the county of Cook, and State of Illinois, have invented certain new and useful Improvements in Hand Seed-Planters; and we do hereby declare that the following is a full, clear, and exact description thereof, reference being had to the accompanying drawings, making part of this specification, and to the letters of reference marked thereon.

Like letters indicate like parts wherever they occur.

To enable others skilled in the art to construct and use our invention, we will proceed to describe it.

Our invention relates to an improved hand seed-planter, and consists in a novel construction and arrangement of the various parts, as hereinafter explained.

In the drawings—

A represents a strong wooden frame, provided with two handles, $j\,j$, at the rear end, and having a barrow-wheel, B, mounted in it at the front end, by which the frame is supported.

Figure 1:
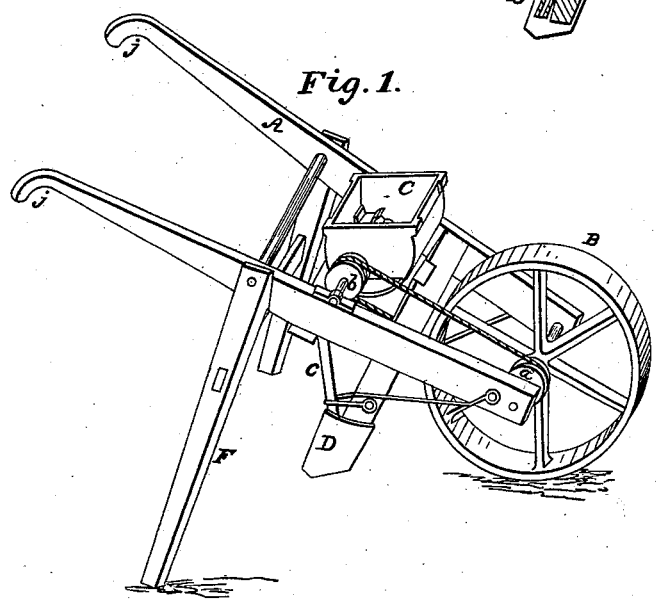
Figure 1 is a perspective view of our machine.

In this said frame, midway between the wheel and the handles, we place a shaft, G, having mounted upon it the seed-hopper C, said hopper being free to oscillate thereon, but prevented from lateral movement by washers or collars secured to the shaft. On this shaft, G, one side of the hopper, we secure a pulley, $b$, connected with and driven from a pulley, $a$, on the shaft of the wheel B, by a cord or belt, as shown in fig. 1.

Between the hopper C and wheel B, to the cross-bar of the frame, we rigidly secure an arm or post, which extends down as far as the ground, and has a shovel or runner attached for opening the furrow for the seed. The rear end of this runner is open or hollow, and has opening into it the lower end of a pipe, $c$, which conducts the seed from the hopper. The upper end of said tube is made funnel-shaped or flaring, and is secured to a cross-bar on the under side of the frame, in the rear of the hopper C, the mouth of the pipe coming close up under the seed-opening of the hopper.

Figure 3:
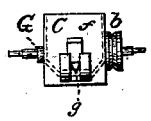
Figure 3 is a rear end elevation of the seed-hopper, showing the opening through which the seed is fed, and the slides for closing the same.

Inside of the hopper, upon the shaft G, we secure a feed-roller, E, having radial curved arms or lips, $e\,e$, extending nearly to the bottom of the hopper, which inclines from the four sides downward toward the centre, as shown in dotted lines in fig. 3, so that when the roller revolves in the proper direction, the arms $e$ will carry the seed up to the opening $g$, through which it will fall into upper end of pipe $c$, and thence run down into the furrow in the rear of the runner.

Figure 2:
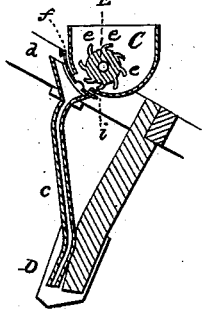
Figure 2 is a vertical section through the centre of the seed-hopper.

To regulate the flow of the seed from the hopper, we make the opening through which it passes, V-shaped, and provide two slides, $f$ and $i$, as in figs. 2 and 3, one at each end of the opening. These slides may be moved independently of one another, and may be made to cover the whole opening, or any portion of it, and by changing the relative positions of the slides with the opening, various forms of openings may be obtained, as nearly square, triangular, long, and narrow, &c., according to the seed to be used.

For the purpose of sustaining the rear end of the machine when standing alone, we hinge to the bar $k$, crosswise of the machine, a secondary frame, F, provided with two legs of such a length, that, when standing perpendicularly, they shall raise the machine high enough to bring the runner out of the ground, and at the same time prevent the machine from falling over sidewise.

This frame, when the machine is pushed forward, will yield and swing out backwards, thus allowing the runner to sink in the earth; but, when the handles $j$ are lifted well up, the frame will, by reason of gravity, hang vertically, and when the handles are lowered, so the legs can touch the earth, the frame F will support the machine, as before described.

The machine thus constructed we find very efficient, as well as being cheap, strong, and light, and may be easily handled by a man or boy.

By having the hopper pivoted, there is no danger of its becoming choked or clogged up with seed, and by using the two slides in combination with the V-shaped opening, not only may the area of the opening be changed, but it may be varied to suit any kind of seed.

It is obvious, that if desired the frame F may be made to serve as a marker, by making the legs a proper distance out from the machine, and allowing them to drag.

Having thus described our invention,

What we claim, is—

1. The combination of the oscillating seed-hopper C, having the feed-roller E therein, with the tube $c$, having the funnel $d$ attached, and the furrow-opener D, all constructed and arranged substantially as described.

2. The V-shaped opening in the hopper, with the slides $f$ and $i$, arranged to operate substantially as and for the purpose set forth.

WILLIAM LEDLIE.
GEO. L. GRAY.

Witnesses:
WM. H. LOTZ,
A. LIMBERG.